United States Patent [19]

Kelleher

[11] 4,376,956

[45] Mar. 15, 1983

[54] VIDEO DISC PLAYER HAVING TIMEBASE CORRECTION AND CONSTANT ANGULAR VELOCITY TURNTABLE

[75] Inventor: Kevin C. Kelleher, Plainfield, Ind.

[73] Assignee: RCA Corporation, New York, N.Y.

[21] Appl. No.: 196,280

[22] Filed: Oct. 14, 1980

[51] Int. Cl.³ .................... H04N 5/76; G11B 21/02
[52] U.S. Cl. ................................... 358/322; 358/321; 358/338; 358/342; 360/36.1; 369/43
[58] Field of Search ............... 358/8, 4, 127, 128.5, 358/128.6, 13, 322, 321, 338, 342, 320, 337, 310, 335, 339, 323; 360/36, 33, 75, 70, 33.1, 36.1, 36.2; 369/43, 50, 111, 126, 215, 220, 233, 240, 241

[56] References Cited

U.S. PATENT DOCUMENTS

| | | | |
|---|---|---|---|
| 3,711,641 | 1/1973 | Palmer | 178/6.6 TC |
| 3,906,152 | 9/1975 | Hoogendijk | 358/128.5 |
| 3,965,482 | 6/1976 | Burrus | 358/8 |
| 3,967,311 | 6/1976 | Fuhrer | 358/128.6 |
| 3,983,318 | 9/1976 | Miller | 369/43 |
| 4,165,495 | 8/1979 | Takahashi | 369/111 |

Primary Examiner—Alan Faber
Attorney, Agent, or Firm—E. M. Whitacre; J. S. Tripoli; R. G. Coalter

[57] ABSTRACT

The burst component of a video signal recovered from a video disc record is applied to a timebase correction servo for controlling the tangential position of the player pick-up transducer in a sense to minimize timebase errors. The record is rotated at a constant angular velocity whereby, for a given displacement of the pick-up transducer, the servo loop gain tends to vary with the radial position of the transducer which, in turn, undesirably influences the servo sensitivity and dynamic stability. A loop gain compensator, responsive to a second component of the recovered video signal proportional to the playing time of the disc, regulates the servo gain at a substantially constant value thereby improving the loop stability and sensitivity.

7 Claims, 3 Drawing Figures

VIDEO DISC PLAYER HAVING TIMEBASE CORRECTION AND CONSTANT ANGULAR VELOCITY TURNTABLE

This invention relates to video disc players and particularly to players of the type used for recovering video signals from a disc shaped record rotated at a substantially constant angular velocity and in which timebase correction of the recovered signal is effected by control of the tangential position of the signal pickup stylus (or laser beam) relative to the record being played.

Video disc players have been proposed in which a control signal is derived from a component of the recovered video signal and applied to a tangential position control transducer which moves the laser beam or pickup stylus of the player in a sense to minimize timebase errors of the recovered video signal. As an example, in the system proposed by T. W. Burrus in U.S. Pat. No. 3,965,482 entitled "VELOCITY CORRECTION CIRCUIT FOR VIDEO DISCS" which issued June 22, 1976, the timebase correction control signal is derived from the burst component of the recovered video signal. In the system proposed by R. C. Palmer in U.S. Pat. No. 3,711,641 entitled "VELOCITY ADJUSTING SYSTEM" which issued Jan. 16, 1973, the timebase correction signal is derived from the horizontal synchronizing component of the recovered video signal.

The present invention is directed to solving a problem which may arise when video disc players of the general kind described above are used for playing disc shaped records at a substantially constant angular velocity. In records designed for such use, the information elements (of whatever form) are more closely spaced near the inner radius of the recorded information on the record than those near the outer radius. If, for example, the inner radius is four inches and the other radius is eight inches, the recorded signal element density (i.e., signal elements per linear inch of the signal track) will vary by a factor of two as the record is played. The density will increase when the direction of play is from the outer radius to the inner radius and will decrease when the direction of play is reversed.

The problem is that since the signal element density varies as the record is played, the effective gain or sensitivity of the timebase error correction transducer also varies. As an example, assume that the error correction transducer has a tangential displacement factor of say, one micro-inch per milliamp. For a given input current supplied to the correction transducer, the pickup transducer stylus (or laser beam) will then traverse twice as many signal elements for a given tangential displacement when playing the innermost track of the record than when playing the outer most track (assuming, as before, four and eight inch radii for the recorded information on the record). In effect, then, even though the correction transducer has a constant current-to-distance conversion factor, its effective conversion factor or gain will increase by a factor of two (6 dB) as the record is played from the outer radius to the inner radius and will decrease by the same factor when the direction of play is opposite (i.e., from the inner radius to the outer radius).

Since the timebase error correction transducer is coupled to and controls the video signal pickup transducer, the resultant closed loop servo system which is formed will exhibit a loop gain which is dependent upon the radial position of the pickup transducer relative to the record being played. One consequence of such a dependence is that if the servo loop gain is set to a value where the loop exhibits maximum sensitivity for information recorded at the outer radius of the information track, then the increase in loop gain which occurs at the inner radius may cause the loop to exhibit instability (i.e., a tendency toward oscillation). On the other hand, if the servo loop gain is set for maximum sensitivity for the more "densely packed" information at the inner radius of the recorded information track (or tracks), then the loop stability will be somewhat improved for playback at the outer radius of the information track but the loop sensitivity (i.e., ability to correct timebase errors) will be substantially lessened. In short, a compromise must be made between loop sensitivity and loop stability.

A need exists for a video disc player suitable for playback of disc shaped records of the constant angular velocity type, for providing timebase correction of the recovered video signal and in which parameters of the correction servo loop, such as sensitivity and stability, are rendered substantially independent of the radial position of the player pickup transducer relative to the record. The present invention is directed to meeting that need.

A video disc player, in accordance with the invention, comprises the combination including a turntable means for rotating the video disc record at a predetermined substantially constant angular velocity and a transducer means for recovering a recorded signal from the record. A signal processing means, responsive to a first component of the recovered signal, produces a timebase error correction signal. A feedback means applies the timebase error correction signal to the transducer means in a sense to minimize timebase errors of the recovered signal thereby forming a closed loop servo system which tends to exhibit a loop gain dependent upon the radial position of the transducer with respect to the record. A loop gain compensating means, responsive to a second component of the recovered signal, regulates the loop gain of the closed loop servo system.

IN THE DRAWINGS

Figure 1:
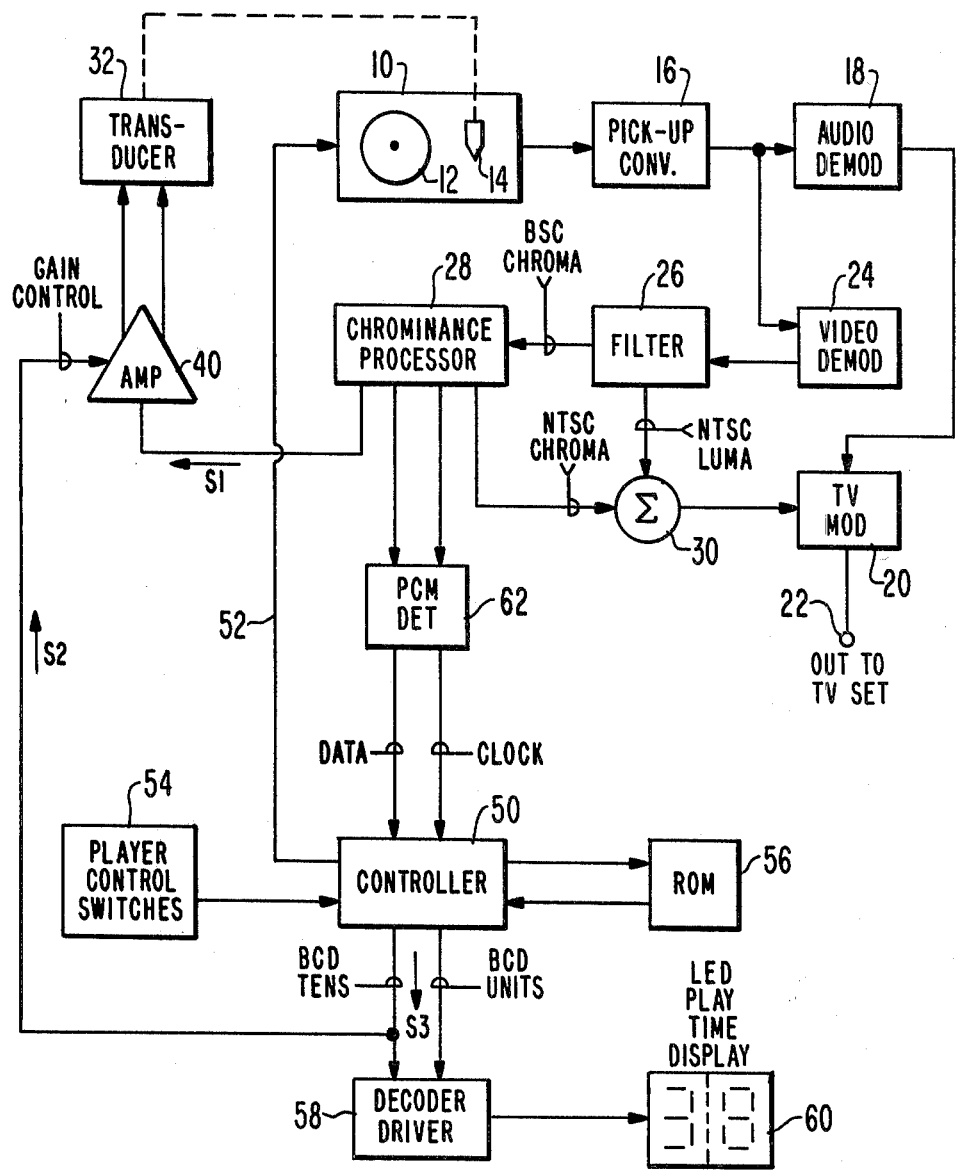
FIG. 1 is a block diagram of a video disc player embodying the invention.

The video disc player of FIG. 1 includes a player mechanism 10 having a turntable for rotating a video disc record 12 at a constant angular velocity and a pickup transducer 14 for recovering information signals from the disc. Illustratively, it will be assumed that the player is intended for use with records in which information is stored in the form of topological variations and recovered by sensing capacitance variations between pickup transducer 14 and the record 12. The output of transducer 14 is coupled to the input of a pickup converter 16 which comprises a capacitance-to-voltage converter responsive to capacitance variations between a stylus in transducer 14 and the record being played for producing an FM output signal voltage representative of the recorded information.

Such records and suitable circuits for implementing the capacitance-to-voltage conversion function of pickup converter 16 are well known. See, for example, U.S. Pat. No. 3,783,196 entitled "HIGH-DENSITY CAPACITIVE INFORMATION RECORDS AND PLAYBACK APPARATUS THEREFOR" which issued to T. O. Stanley, Jan. 1, 1974; U.S. Pat. No. 3,972,064 entitled "APPARATUS AND METHODS FOR PLAYBACK OF COLOR PICTURES/SOUND RECORDS" which issued to E. O. Keizer, July 27, 1976; and U.S. Pat. No. 3,711,641 entitled "VELOCITY ADJUSTING SYSTEM" which issued to R. C. Palmer, Jan. 16, 1973.

The output of converter 16 is applied to the input of an audio FM demodulator 18 which demodulates the audio FM portion of the recovered signal to baseband. The baseband audio signal is applied to the sound carrier modulation input of a TV modulator 20 which has an output terminal 22 for connection to the antenna terminals of a conventional television receiver. The video portion of the recovered signal is processed as will be described and applied to the baseband video input terminal of modulator 20 which produces video and sound carriers on a selected TV channel for reception by the television receiver. An integrated circuit suitable for use as TV modulator 20 and which may be selectively operated to produce output signals on channels 3 or 4, for example, is the model LM1889N "TV VIDEO MODULATOR" made by National Semiconductor Company, Inc.

Video FM demodulator circuit 24 converts the video FM signal produced by pickup circuit 16 to a baseband video output signal. For purposes of illustrating certain features of the invention, it will be assumed that the video signals recorded on the disc are in the "buried subcarrier" (BSC) format rather than the conventional NTSC format. As is known (see, for example, U.S. Pat. No. 3,872,498 entitled "COLOR INFORMATION TRANSLATING SYSTEMS", which issued to D. H. Pritchard, Mar. 18, 1975), in the BSC format, chrominance information is represented by a color subcarrier of the general form employed in the well-known NTSC format. However, the chrominance component in the BSC format is not located in the high end of the luminance signal video band, as in NTSC, but rather is buried in a lower portion of the video band. An illustrative subcarrier frequency choice is in the vicinity of 1.53 MHz, with the color subcarrier side bands extending ±500 KHz thereabout and, with the luminance signal band extending well above the highest color subcarrier frequency (to 3 MHz, for example).

FM demodulator 24 (and also audio demodulator 18) illustratively may be of the pulse counting type or of the phase-lock-loop (PLL) type. A suitable pulse counting type FM demodulator is disclosed in U.S. Pat. No. 4,038,686 entitled "DEFECT DETECTION AND COMPENSATION" which issued to A. L. Baker July 26, 1977. An FM demodulator of the phase-lock-loop type is described in U.S. patent application, Ser. No. 948,013 of T. J. Christopher et al., entitled "FM SIGNAL DEMODULATOR WITH DEFECT DETECTION" which was filed Oct. 2, 1978, and issued May 13, 1980, as U.S. Pat. No. 4,203,134.

The composite video signal produced by demodulator 24 is separated into a buried subcarrier (BSC) chrominance component and a luminance component by means of filter 26 which, preferably, is a comb filter. A suitable comb filter is described in U.S. Pat. No. 3,996,606. A preferred filter is described in the U.S. patent application of T. J. Christopher and L. L. Tretter entitled "VIDEO PROCESSING SYSTEM INCLUDING COMB FILTERS" Ser. No. 966,512 filed Dec. 4, 1978, which issued Mar. 25, 1980, as U.S. Pat. No. 4,195,309. Another example is disclosed in U.S. Pat. No. 3,996,610 entitled "COMB FILTER APPARATUS FOR VIDEO PLAYBACK SYSTEMS" which issued Dec. 7, 1976, to H. Kawamoto.

The chrominance signal produced by filter 26 is converted from buried subcarrier format (e.g., 1.53 MHz) to NTSC format (e.g., 3.58 MHz) by means of chrominance processor 28 and the converted chrominance signal is then combined with the luminance signal produced by filter 26 by means of summing circuit 30. The resultant NTSC standard composite video signal is then applied to the video input terminal of modulator 20, as previously mentioned, to provide modulated picture and sound carrier waves to terminal 22.

Processor 28 is of the color burst locked heterodyne conversion kind as disclosed, for example, in U.S. Pat. No. 3,965,482 entitled "VELOCITY CORRECTION CIRCUIT FOR VIDEO DISCS" which issued to T. W. Burrus, June 22, 1976. The processor includes color burst error detection circuitry for varying the frequency of a heterodyne conversion oscillator in a sense to minimize chrominance signal timebase errors and for generating a "velocity" or position control signal, S1. The signal S1 is applied, as will be explained, to transducer 32 which is mechanically coupled to the player pickup transducer 14 for controlling the tangential position of the pickup stylus relative to the video information track recorded on the disc 12. If the disc is out-of-round, for example, the control signal S1, derived from detected color burst errors, causes transducer 32 to change the effective length of the pickup arm in consonance with rotation of the disc in a sense to compensate for its eccentricity and thereby reduce the error.

Another suitable implementation of processor 28 for NTSC standard players is disclosed in the U.S. patent application of G. D. Pyles, J. A. Wilber and T. J. Christopher entitled "FAST RECOVERY SQUELCH CIRCUIT FOR A VIDEO DISC PLAYER" Ser. No. 068,015 filed Aug. 20, 1979 and which issued Aug. 25, 1981, as U.S. Pat. No. 4,286,290. A suitable implementation of processor 28 for PAL standard players is disclosed in the U.S. patent application of J. G. Amery entitled "CHROMINANCE TRANSCODER" Ser. No. 154,597 filed May 29, 1980 and which issued Feb. 2, 1982, as U.S. Pat. No. 4,314,273.

A transducer (commonly called an "arm stretcher" transducer) suitable for providing the function of transducer 32 is described, for example, in U.S. Pat. No. 3,882,267 entitled "VIDEO PLAYBACK SYSTEM TRACKING ARM AND PICKUP ASSEMBLY" which issued to M. A. Leedom, May 6, 1975. Another example is U.S. Pat. No. 3,983,318 entitled "VELOCITY CORRECTION SYSTEM WITH DAMPING MEANS" which issued to M. E. Miller and J. G. Amery, Sept. 28, 1976.

Summarizing to this point (and still ignoring, for the moment, amplifier 40) chrominance processor 28 detects timebase errors in the burst component of the signal recovered from disc 12 and produces the timebase (or "velocity") error correction signal S1. "Arm-stretcher" transducer 32 serves as a means for applying the correction signal S1 to pickup transducer 14 in a sense to minimize the timebase errors. Accordingly, a closed loop servo system is formed. Since the disc 12 is rotated at a substantially constant angular velocity, the servo system will tend to exhibit a loop gain dependent upon the radial position of transducer 14 relative to disc 12 for the reasons previously explained.

The tendency for the servo loop gain to vary is minimized, in this example of the invention, by means of controllable gain amplifier 40 which couples the signal S1 to transducer 32 and, in response to a control signal (S2) derived from a second component of the recovered video signal, regulates the loop gain of the closed loop servo system by controlling the gain of amplifier 40. The signal S2, as will be explained, is representative of the radial position of pickup transducer 14 relative to disc 12. As disc 12 is played, in either direction (i.e., from the inner radius to the outer radius of the recorded signal or vice versa), S2 causes the gain of amplifier 40 to change in a sense to regulate the overall closed loop gain of the timebase correction servo system to be substantially independent of the radial position of the pickup transducer 14 relative to disc 12.

It is a feature of the invention that the gain control signal S2 is derived from information recovered from disc 12 by means of transducer 14. This avoids any need to directly sense the radial position of pick-up transducer 14 by mechanical means and provides a significant advantage with regard to factors such as cost, complexity, reliability, etc. Moreover, the gain control signal S2 is obtained, in this specific example of the invention, at essentially no cost. This advantage is gained, as will be explained, by deriving the signal S2 from a digital signal manifestation, S3, produced by a controller 50 in the player. The signal S3 is normally used for providing an indication of the playing time of disc 12. In effect controller 50 is used to advantage for providing the dual functions of both generating a playing time indication signal and controlling the gain of amplifier 40.

In more detail, controller 50 is preferably microprocessor based (as opposed to being implemented with random logic) and provides various supervisory control and information display functions. The principal control functions (supplied via cable 52 to the turntable mechanism 10) include, illustratively, control of the radial position, elevation, radial velocity and direction of movement of pick-up transducer 14 relative to disc 12. Some of the functions are initiated manually by means of player control switches 54 coupled to an input port of the controller. Manually initiated functions include, illustratively, play, pause, slow scan forward or reverse and fast scan forward or reverse. Upon closure of one of switches 54, controller 50 addresses read only memory (ROM) 56 and fetches an appropriate sequence of instructions resident in the memory for effecting the desired control function.

For purposes of the present invention, the main function of controller 50 is to generate the time display signal S3 in binary coded decimal form (BCD) which is decoded by decoder driver 58 to seven segment form and applied to a two digit seven segment light emitting diode (LED) display 60. The BCD "tens" component of S3 is applied as the gain control signal S2 to amplifier 40.

For generation of the playing time signal S3, it is preferred that controller 50 be of the general kind described by C. B. Dieterich in his U.S. patent application, Ser. No. 084,393 filed Oct. 12, 1979 and entitled "VIDEO DISC SYSTEM" which issued Dec. 29, 1981, as U.S. Pat. No. 4,308,557. Controller 50 receives clock and data signals from processor 28 and is preferably interfaced therewith by means of a PCM detector 62 as described in C. B. Dieterich's U.S. patent application entitled "PCM DETECTOR", Ser. No. 125,641 filed Feb. 28, 1980 which issued July 23, 1981, as U.S. Pat. No. 4,275,416.

As proposed in the Dieterich system application, a selected line during the vertical interval of each field recorded on disc 12 contains pulse code modulated data. In odd fields the selected line is number 17 and in even fields it is number 280. The data is entered or "loaded" into controller 50 by means of the clock signal which is of the buried subcarrier frequency (1.53 MHz) and synchronous with the data. Within controller 50 the data is checked for validity by means of error detection circuitry and, if no errors are found, is operated upon by the controller for providing the aforementioned supervisory control functions.

In the code proposed by Dieterich, a 13 bit Barker code is used as a PCM decomutation start code to minimize framing errors. This is followed by a 13 bit error check code to minimize bit errors, a 27 bit information code and then 24 bits used for video field and band identification. The playing time is preferably derived from the recovered field numbers by controller 50 by dividing the field numbers by a constant as described in the U.S. patent application of J. C. Rustman and M. J. Mindel entitled "TRACK ERROR CORRECTION SYSTEM AS FOR VIDEO DISC PLAYERS", Ser. No. 084,386 filed Oct. 12, 1979 which issued Dec. 22, 1981, as U.S. Pat. No. 4,307,418.

The gain of amplifier 40 could be controlled, if desired, by means such as an analog multiplier (e.g., an operational transconductance amplifier, a "Gilbert" cell multiplier, etc.) but this would require conversion of the digital signal S2 to analog form by digital to analog conversion means (e.g., and R/2R ladder). It is a further feature of the invention that the gain of amplifier 40 is controlled directly by the digital signal S2 without conversion of S2 to an analog form.

Figure 2:
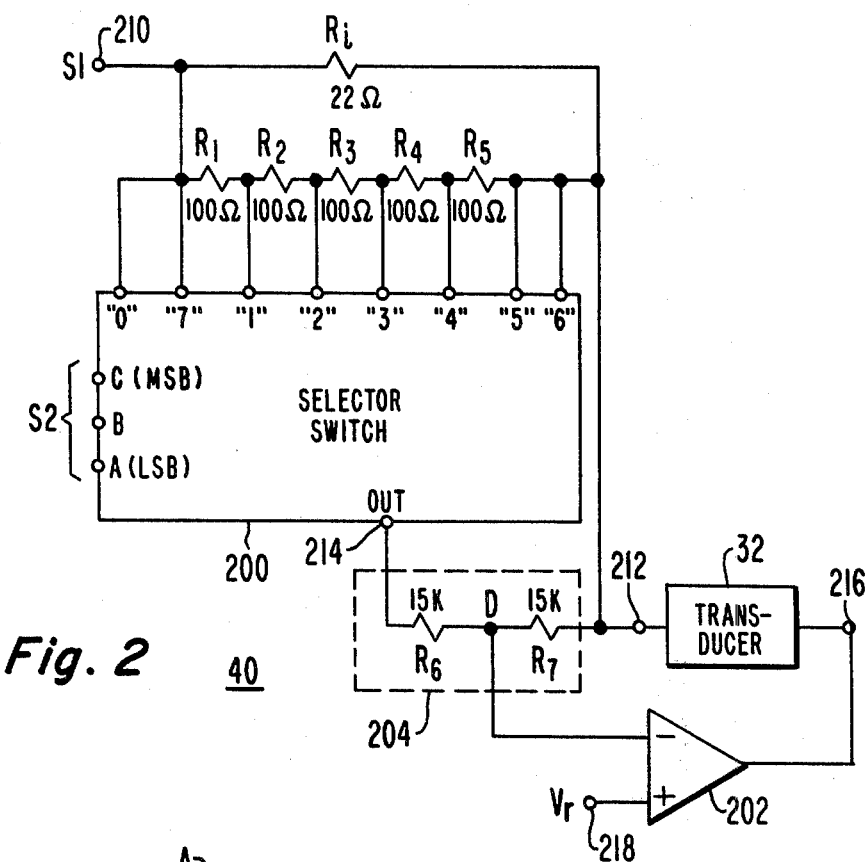
FIG. 2 is a circuit diagram, partially in block form, of a controllable gain amplifier suitable for use in the player of FIG. 1.

FIG. 2 illustrates a preferred form of amplifier 40 having the direct digital gain control feature noted above and which additionally functions as a VIC (voltage-to-current converter) for supplying a current to transducer 32 proportional to the voltage difference between the signal S1 and a reference voltage Vr. This latter feature is provided for players of the type in which transducer 32 provides a displacement proportional to current (e.g., an electrodynamic transducer). Where transducer 32 is of the type providing a displacement proportional to voltage (e.g., an electrostatic transducer) the VIC feature may not be needed. In such a case the transducer 32 would be coupled between the output of amplifier 202 and a suitable source of potential and feedback for amplifier 202 would be provided by a resistor.

Considering now the details of FIG. 2, amplifier 40 comprises four principal elements: (1) an input resistor, Ri; (2) a digitally controlled variable attenuator (R1–R5 and switch 200); (3) a fixed attenuator 204 (R6 and R7); and (4) a differential amplifier 202. Representative values of all resistors are illustrated in the drawing. Selector switch 200 is a digitally controlled one-of-eight analog selector switch such as the type CD4051B integrated circuit manufactured by RCA Corporation. Amplifier 202 is a conventional operational amplifier (e.g., a type 741 internally compensated integrated circuit operational amplifier) and preferably includes a buffer amplifier at its output (not shown) to provide increased output current drive capability. Suitable buffer amplifiers (e.g., a complementary common collector stage or "emitter follower") are well known. Transducer 32 is shown connected between the output terminals (212 and 216) of amplifier 40 for purposes of explanation of the circuit operation and will be assumed to be of the electrodynamic type previously mentioned.

Input resistor Ri is connected between input terminal 210 and output terminal 212 of amplifier 40. A potential divider comprising a series connection of five equal valued resistors R1-R5 is connected in parallel with input resistor R1. The analog signal input terminals (0-7) of switch 200 are connected as follows: terminals "0" and "7" to input terminal 210; terminal "1" to the common connection of R1 and R2; terminal "2" to the common connection of R2 and R3; terminal "3" to the common connection of R3 and R4; terminal "4" to the common connection of R4 and R5; and terminals "5" and "6" to output terminal 212.

The input signal S2 is applied to the control terminals A, B and C of switch 200 of which terminal A is the least significant bit (LSB) input and terminal C is the most significant bit (MSB) input. The output terminal 214 of switch 200 is coupled via series connected equal valued resistors R6 and R7 to terminal 212. The common connection of resistors R6 and R7 (which, being equal valued, form a 6 dB attenuator 204) is connected to the inverting input of amplifier 202 which is connected at the non-inverting input thereof to an input terminal 218 and at the output thereof to output terminal 216.

In operation, the current conducted by input resistor Ri flows through transducer 32 (for purposes of discussion the additional current conducted by resistors R1-R5 may be neglected since the sum of the values of resistors R1-R5 is much greater than the value of Ri). The voltage across resistor Ri is regulated by means of amplifier 202 as a function of the difference between the input signal S1 and the reference voltage Vr and the setting of switch 200. Since the voltage across Ri is regulated, the current flowing through transducer 32 is also regulated and independent of the voltage between terminals 212 and 216.

The feature of direct digital gain control (by switch 200) and limitation of maximum and minimum gain values (by attenuator 204) is most easily understood by considering some specific examples. As a first example, assume that: (1) the reference voltage Vr is zero volts (Vr represents the servo system zero timebase error reference voltage level); (2) the signal S1 is a positive voltage of 22 millivolts; and (3) the signal S2 is octal five (positive logic, 101). Under these assumptions, switch 200 will couple input terminal "5" to output terminal 214 whereby no potential difference can exist across resistors R6 and R7. Accordingly, node D (the common connection of R6 and R7) must assume the same voltage as output terminal 212. Since node D is connected to the inverting input of operational amplifier 202, the negative feedback provided via transducer 32 will maintain node D (and thus output terminal 212) at the potential (zero volts) at the non-inverting input of amplifier 202. Accordingly, the voltage produced across the input resistor will be S1-0 or 22 millivolts. By Ohm's law, the current through resistor Ri will be one milliampere and the same current (neglecting, as previously stated, R1-R5) will necessarily flow through transducer 32.

This condition represents the minimum "gain" of amplifier 40 (expressed in terms of transconductance, the result is about 45 millimhos).

Now consider the case where the signal S2 is zero (octal 000). Under this condition, switch 200 will couple terminal "0" to terminal 214 and a potential difference will appear across resistor R6. Since node D is regulated at the assumed value (zero volts) of Vr by amplifier 202, the voltage across R6 will equal S1 (assumed 22 millivolts). Since the current conducted by R6 also flows through R7, the net potential difference between terminals 214 and 212 will thus equal 2 S1 (44 millivolts). Accordingly, under this condition the voltage across Ri will be double that of the previous example and so the maximum gain change of amplifier 40 is from 45 to 90 millimhos.

The gain range of 6 dB or a factor of 2 is determined by the fixed 6 dB attenuator 204. For any value of S2 between the limits of zero and five the gain will change within this range by equal steps of 20 percent each since there are five equal valued resistors in the digitally programmable variable potentiometer formed by switch 200 and resistors R1-R5. It will be appreciated that finer gain resolution may be obtained by adding additional switches and resistors. For example, the "minutes" display could be used to control a ten step attenuator added to amplifier 40 thereby providing a gain resolution of 60 steps rather than the six steps illustrated.

The reason that terminals "5" and "6" are connected in common is that in this specific application of amplifier 40 the disc 12 is designed for a maximum playing time of about 60 minutes and the normal forward direction of play is from the outer radius of the information track to the inner radius. Accordingly, the gain of amplifier 40 reaches a minimum after 50 minutes of playing time and is maintained at the minimum value through 60 minutes (up to 69 minutes if needed). The reason that terminal "7" is connected to terminal "1" is that the signal S3 assumes an "all ones" condition for blanking display 60 when the player is initially turned on. As a result, the signal S2 (tens of minutes) will also be "all ones" (i.e., A=1, B=1, C=1). By connecting terminal "7" to terminal "0" it is assured that the servo loop gain will be set to its maximum value at the start of play even though display 60 is initially blanked before the zero digit of the tens of minutes display appears.

Figure 3:
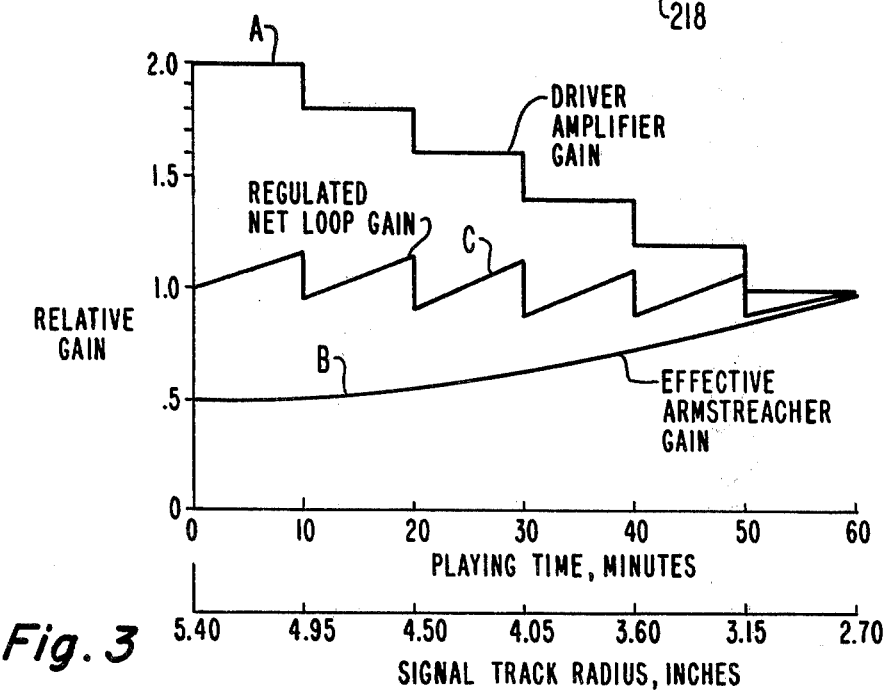
FIG. 3 is a waveform diagram illustrating operation of the amplifier of FIG. 2 in the player of FIG. 1.

FIG. 3 illustrates the overall effect on the servo system of amplifier 40 as disc 12 is played. Waveform A represents the step changes in the gain of amplifier 40 as a function of the playing time of disc 12 and the radial position of the pick-up transducer relative to disc 12. Waveform B illustrates the effective "armstretcher" gain change which occurs at the record is played. Waveform C illustrates the combined effects of waveforms A and B on the overall timebase correction servo system loop gain. As is seen, even though the effective armstretcher gain changes by a factor of two, the overall loop gain is regulated at a substantially constant value by the reduction in gain (also by a factor of two) of the amplifier 40. As the number of gain steps of amplifier 40 is increased (e.g., to 60 as previously mentioned) the net loop gain variation will decrease and, in a limiting case, approach zero. The five step changes in gain shown, however, have been found in practice of the invention to provide sufficient regulation of the servo loop gain for practical purposes.

What is claimed is:

1. A video disc player, comprising, in combination:
   turntable means for rotating a video disc record at a predetermined substantially constant angular velocity;
   transducer means for recovering a recorded signal from said record;
   signal processing means responsive to a first component of the recovered signal for producing a timebase error correction signal;
   feedback means for applying said timebase error correction signal to said transducer means in a sense to minimize timebase errors of said recovered signal thereby forming a closed loop servo system, said system tending to exhibit a loop gain dependent upon the radial position of said transducer with respect to said record; and
   loop gain regulating means responsive to a second component of said recovered signal for regulating the loop gain of said closed loop servo system.

2. A video disc player, comprising:
   turntable means for rotating a video disc record at a predetermined substantially constant angular velocity;
   transducer means for recovering a recorded signal from said record;
   signal processing means responsive to a first component of the recovered signal for producing a timebase error correction signal;
   feedback means for applying said timebase error correction signal to said transducer means in a sense to minimize timebase errors of said recovered signal thereby forming a closed loop servo system, said system tending to exhibit a loop gain dependent upon the radial position of said transducer with respect to said record;
   loop gain compensating means responsive to a second component of said recovered signal for regulating the loop gain of said closed loop servo system, said second component of said recovered video signal comprising a digital signal manifestation representative of the radial position of said transducer means with respect to said video disc record, said loop gain compensating means comprising:
   variable gain amplifier means interposed in said closed loop servo system for regulating said loop gain in accordance with a control signal; and
   signal processing means for deriving said control signal from said digital signal manifestation and supplying said control signal to said amplifier means.

3. A video disc player, comprising:
   turntable means for rotating a video disc record at a predetermined substantially constant angular velocity;
   transducer means for recovering a recorded signal from said record;
   signal processing means responsive to a first component of the recovered signal for producing a timebase error correction signal;
   feedback means applying said timebase error correction signal to said transducer means in a sense to minimize timebase errors of said recovered signal thereby forming a closed loop servo system, said system tending to exhibit a loop gain dependent upon the radial position of said transducer with respect to said record;
   loop gain compensating means responsive to a second component of said recovered signal for regulating the loop gain of said closed loop servo system, said second component of said recovered video signal comprising a digital signal manifestation representative of field indentification numbers of said recovered signal, said loop gain compensating means comprising:
   variable gain amplifier means interposed in said closed loop servo system for regulating said loop gain in accordance with a control signal; and
   signal processing means for deriving said control signal from said field identification numbers of said digital signal manifestation.

4. A video disc player, comprising:
   turntable means for rotating a video disc record at a predetermined substantially constant angular velocity;
   transducer means for recovering a recorded signal from said record;
   signal processing means responsive to a first component of the recovered signal for producing a timebase error correction signal;
   feedback means for applying said timebase error correction signal to said transducer means in a sense to minimize timebase errors of said recovered signal thereby forming a closed loop servo system, said system tending to exhibit a loop gain dependent upon the radial position of said transducer with respect to said record;
   loop gain compensating means responsive to a second component of said recovered signal for regulating the loop gain of said closed loop servo system, said second component of said recovered signal comprising a digital signal manifestation representative of field identification numbers of said recovered signal, said loop gain compensating means comprising:
   variable gain amplifier means interposed in said closed loop servo system for regulating said loop gain in accordance with a digital control signal;
   signal processing means responsive to said digital signal manifestation for dividing said field identification numbers by a given constant to produce a digital playing time indication signal; and
   means for applying a component of said digital playing time identification signal as said digital control signal to said amplifier means.

5. A video disc player comprising:
   turntable means for rotating a video disc record at a predetermined substantially constant angular velocity;
   pickup transducer means for recovering a recorded video signal from said record, the recovered video signal including a color burst component and a pulse code modulated data component;
   timebase error correction servo system means responsive to timebase errors of said color burst component for supplying a feedback signal to said transducer means in a sense to minimize timebase errors of said recovered signal, said servo system means tending to exhibit a loop gain dependent upon the radial position of said pick-up transducer with respect to said record;
   variable gain amplifier means interposed in a signal path in said servo system means for controlling the magnitude of said feedback signal in response to a control signal supplied thereto;

signal processing means responsive to said pulse code modulated data component of said recovered video signal for producing said control signal; and means for applying said control signal to said amplifier means in a sense to counteract the tendency of the loop gain of said servo system to change with the radial position of said pickup transducer with respect to said record.

6. A video disc player as recited in claim 5 wherein said signal processing means comprises digital signal processing circuit means for producing a record playing time indication signal for application to a playing time indicator means and further comprising:

means for applying at least a component of said playing time indication signal to said amplifier means as said control signal.

7. A video disc player as recited in claim 5 wherein said control signal comprises a digital signal manifestation and wherein said amplifier means comprises:

variable attenuator means responsive to said digital signal manifestation for changing the gain of said amplifier means in discrete steps; and fixed attenuator means coupled to said variable attenuator means for controlling the range of gain variation of said amplifier means independently of the number of discrete steps in gain provided by said variable attenuator means.

* * * * *